UNITED STATES PATENT OFFICE.

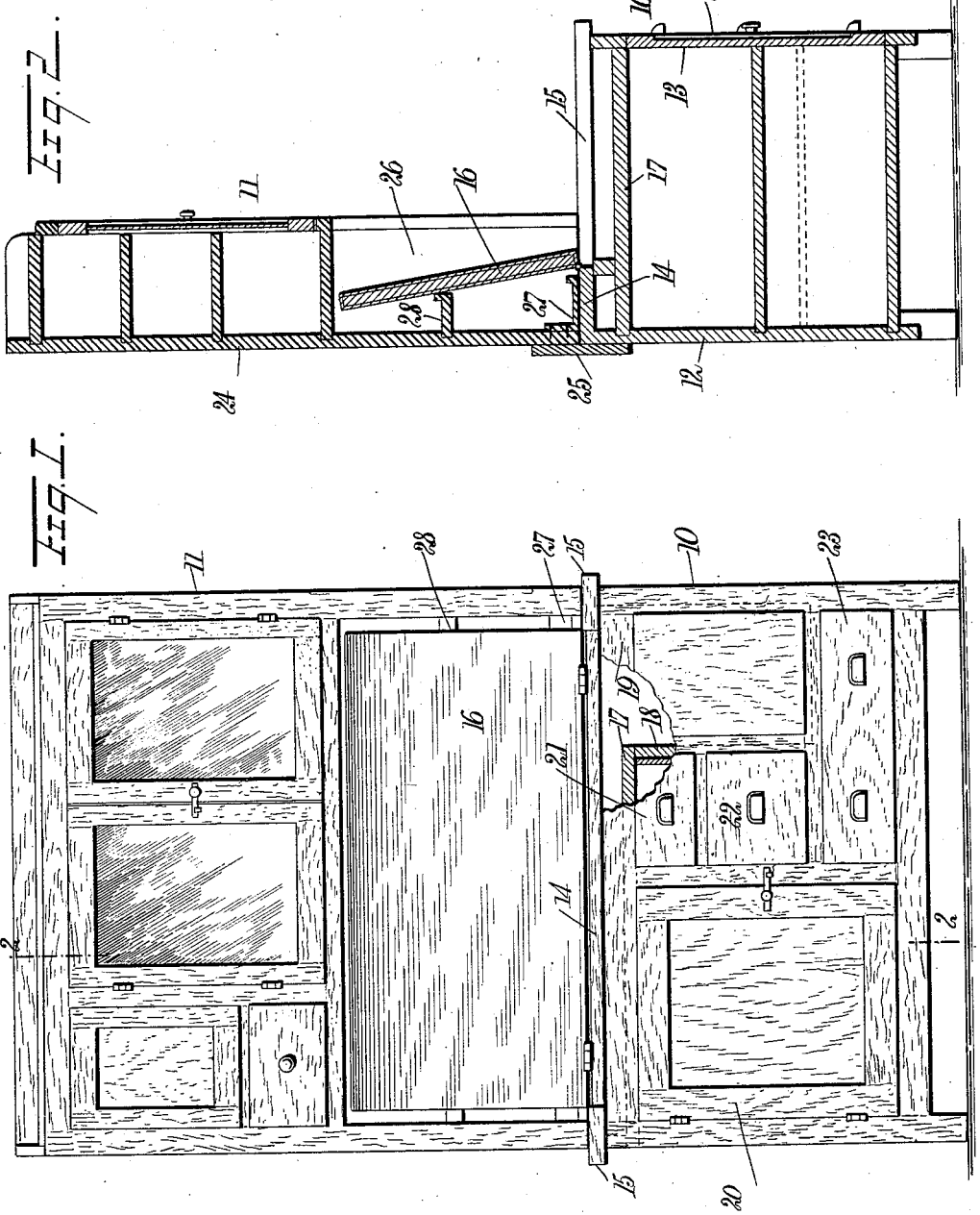

CHARLES F. WELGE, OF CHESTER, ILLINOIS.

COMBINED KITCHEN-CABINET AND CUPBOARD.

1,046,242. Specification of Letters Patent. Patented Dec. 3, 1912.

Application filed January 29, 1912. Serial No. 673,970.

*To all whom it may concern:*

Be it known that I, CHARLES F. WELGE, a citizen of the United States, and residing at Chester, in the county of Randolph and State of Illinois, have invented a new and Improved Combined Kitchen-Cabinet and Cupboard, of which the following is a full, clear, and exact specification.

My invention provides an improved article of kitchen furniture comprising a cabinet especially adapted to removably support, by its top frame, a superposed cupboard which may vary as to its size and design.

In carrying out my invention the permanent features of the cupboard are so arranged as to permit of the lower portion of the cupboard receiving and supporting a hinged lid provided on the cabinet. The lid forms the cover for a flour bin and for a kneading board which is solidly supported below the lid and conveniently located with respect to the flour bin.

Other distinctive features of the invention will appear from the more specific description hereinafter to be given in connection with the illustrated example.

Reference is to be had to the accompanying drawings forming a part of this specification, in which similar characters of reference indicate corresponding parts in both the figures.

Figure 1 is a front view of my improved combination cabinet and cupboard, showing the door of the cabinet raised, a portion of the front of the cabinet being broken away; and Fig. 2 is a vertical section on the line 2—2 of Fig. 1.

The cabinet is designated by the numeral 10, the cupboard by the numeral 11. The cabinet is in general of rectangular form, and comprises a back 12, a front 13, and sides as usual, and it is provided also with a three-sided top frame consisting of a back member 14 and side members 15, the latter extending forwardly to the front. In the space formed by the said top frame I provide a lid 16 which is hinged to the front edge of the back member 14, to swing upward. The lid 16 is in practice covered with metal and serves as a general workboard, which forms in the lowered position, a complete closure for the open top of the cabinet.

Below the lid 16 the cabinet is formed with a kneading board 17, which extends the full depth of the cabinet between the back and front, and from one side, as at the left, to a point short of the opposite side of the cabinet, as shown in Fig. 2, to a junction with a vertical wall 18 forming one side of a flour bin 19 that is open at the top. There is a free space extending beneath the lid 16 over the kneading board 17, so that said lid extends over the flour bin and kneading board, and affords access to both when the lid 16 is raised. The space between the lid and the kneading board accommodates in practice, such utensils as a rolling pin, cake cutter, etc. The one end of the kneading board marks the height of the flour bin, and the arrangement is such that flour can be conveniently dipped from the bin and deposited on the board.

The cabinet may be provided with any convenient arrangement of closets, drawers, etc., beneath the kneading board and the flour bin, as for example, a closet 20, and drawers 21, 22 and 23.

The cupboard 11 is of a depth considerably less than that of the cabinet, and is supported at the back of the latter, the back 24 of the cupboard being preferably alined with the back 12 of the cabinet, and resting on the back strip 14 of the top frame. Any suitable joint member 25 at the back of the two structures may be provided. The sides 26 of the cupboard are received on and supported by the side members 15 of the top frame of the cabinet, and extend forward on said side strips a distance beyond the back strip 14, so that the lid 16 when raised, will swing upward within the lower portion of the cupboard. On the back 24, at the bottom, a shelf 27 is secured, and preferably this shelf is in alinement with the bottom of the cupboard so as to be received on the back strip 14 and thereby aid in giving stability to the cupboard when in position. There is a second shelf 28 on the back-board 24, above the shelf 27, and of less width than the lower shelf so that the lid 16 may swing beyond the vertical center and receive support against the front edge of the upper shelf.

The cupboard may be fitted with any suitable arrangement of shelves, drawers, etc., above the space in which the lid 16 is received.

By the construction shown it will be apparent that the lid 16 affords a protective covering for the flour bin and kneading board in the interest of cleanliness, and also affords a convenient work board that may be quickly raised and swung out of the way within the cupboard to permit convenient use of the kneading board and flour bin.

Having thus described my invention I claim as new and desire to secure by Letters Patent:—

A kitchen cabinet having a top frame extending at the back and the two sides of the cabinet, and a cupboard having its back supported on the back member of the top frame of the cabinet, and its sides extending along the side members of the top frame of the cabinet, the said cupboard having a shelf in the plane of the bottom of the cupboard and the cabinet having a bin at one end, the bin being open at the top, a partition forming one side of the bin, a fixed kneading board secured at one of its side edges at the top of the mentioned partition and the other side edge secured to a side of the cabinet, compartments beneath the said kneading board opening at the front of the cabinet, and a lid on the cabinet in front of the mentioned shelf of the cupboard, the said lid being hinged to the rear member of the top frame and extending between the two side members to completely close the space formed by the said top frame, the hinged edge of the lid being within the side walls of the cupboard, the front of the cabinet rising above the kneading board and forming a rigid member above said board and constituting a rest for the outer edge of the hinged lid when the latter is in the horizontal position.

In testimony whereof I have signed my name to this specification in the presence of two subscribing witnesses.

CHARLES F. WELGE.

Witnesses:
HERMAN E. GILSTER,
RUDOLPH WELGE.

Copies of this patent may be obtained for five cents each, by addressing the "Commissioner of Patents, Washington, D. C."